April 27, 1926.
R. I. FERNSTROM
VEHICLE SPRING
Filed Oct. 12, 1922
1,582,134
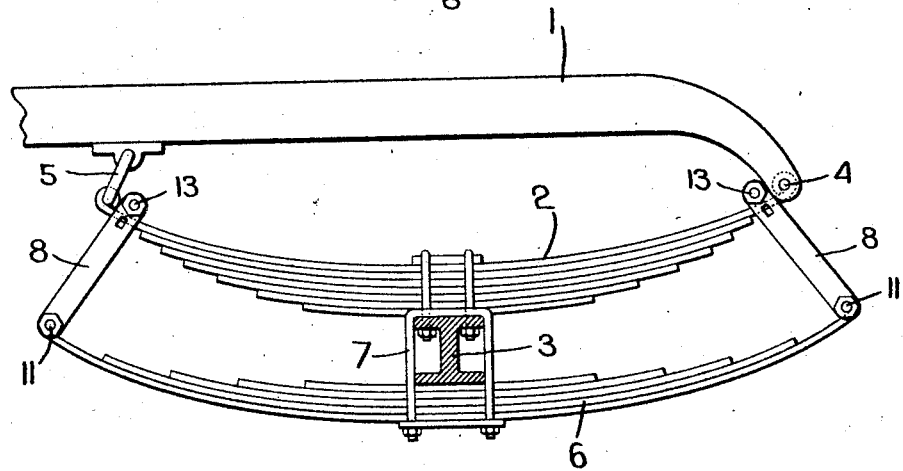
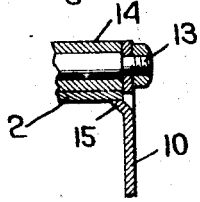 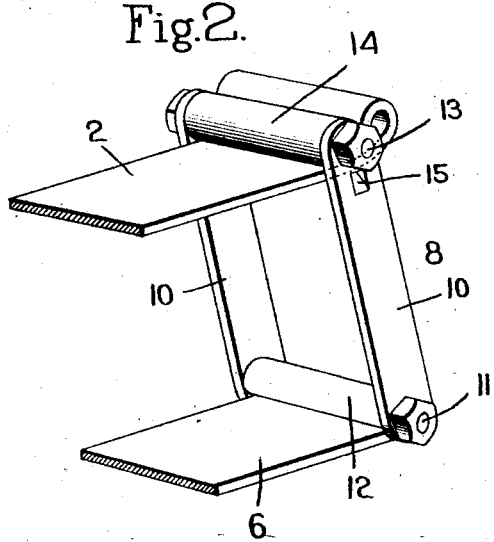
Inventor.
Raymond I. Fernstrom
by Heard Smith & Tennant.
Attys.

Patented Apr. 27, 1926.

1,582,134

UNITED STATES PATENT OFFICE.

RAYMOND I. FERNSTROM, OF SHARON, MASSACHUSETTS.

VEHICLE SPRING.

Application filed October 12, 1922. Serial No. 594,053.

*To all whom it may concern:*

Be it known that I, RAYMOND I. FERNSTROM, a citizen of the United States, and resident of Sharon, county of Norfolk, State of Massachusetts, have invented an Improvement in Vehicle Springs, of which the following description, in connection with the accompanying drawing, is a specification, like characters on the drawing representing like parts.

This invention relates to springs for automobiles and other vehicles and has for its object to provide a novel spring which is constructed so as to eliminate to a great extent the bouncing of the vehicle due to the violent recoil of the spring and also to provide means for exerting a stabilizing influence over the spring so as to cause it to function more evenly and without the disagreeable recoil.

I secure the above-mentioned objects by providing an auxiliary spring in addition to the main body-supporting spring, which auxiliary spring is connected to the main spring and to the axle in such a way that it normally exerts an upward thrust on the axle and a downward pull on the ends of the main spring. This auxiliary spring will preferably have sufficient strength to support the weight of the wheel and axle. The spring functions in two ways. It serves to sustain the weight of the wheel and axle when the latter passes over a hole in the roadway thus preventing the wheel from dropping into the hole, and it also exerts a retarding influence on the recoil of the main spring.

In order to give an understanding of the invention I have illustrated in the drawings a selected embodiment thereof which will now be described after which the novel features will be pointed out in the appended claims.

In the drawings, Fig. 1 is a side view of a vehicle spring embodying my invention.

Fig. 2 is a detail perspective view.

Fig. 3 is a sectional view through the shackle 8.

I have shown herein a sufficient portion only of an automobile to illustrate my invention and 1 indicates a portion of the frame, 3 the front axle and 2 the main body-supporting spring, which is secured centrally to the axle 3 and at one end is connected to the frame 1 as shown at 4 and at the other end is pivotally connected to the shackle 5 which in turn is pivoted to the frame 1.

The parts thus far described are or may be all as usual in automobile construction.

My improved spring construction comprises an auxiliary stabilizing spring 6 which connects the axle with the main spring 2 in such a way as to exert an upward thrust on the axle and a corresponding downward thrust on the main spring. This stabilizing spring 6 may be constructed in various ways without departing from the invention but preferably I will employ a leaf spring, which acts oppositely to the main spring 2. In this stabilizing spring 6 the longer leaf is at the bottom and the shorter leaves are above the longer leaf.

The auxiliary spring is secured centrally to the axle 3 and the ends are connected to the ends of the main spring 2. I have herein shown the auxiliary spring as situated beneath the axle and as secured thereby by means of spring clips 7. The ends of the spring are connected to the ends of the main spring by shackles 8 and this connection is such that normally the auxiliary spring will be placed under a slight tension. In fact I propose to so construct the spring 6 that when it is connected to the main spring, as shown, it will have a strength sufficient to sustain the weight of the axle and wheel so that if the body of the vehicle is jacked up the weight of the axle and wheel will be taken by the spring 6 and the main spring 2 will remain in its normal condition with its leaves closed together.

In operation whenever the wheel passes over a hole in the roadway the lifting action of the auxiliary spring 6 will serve to prevent the wheel from dropping into the hole and will thus eliminate the resulting recoil of the spring which would occur in case the wheel did drop into said hole. This auxiliary spring also functions to prevent violent recoil of the main spring.

Since the auxiliary spring 6 is normally slightly flexed it will follow that if the main spring 2 is compressed by the wheel running over an obstruction or hummock in the roadway the resiliency of the spring 6 will cause it to straighten as the spring 2 is compressed and when the compressed force on the spring 2 ceases and as said spring tends to recoil the spring 6 will have a retarding influence against this recoil and will eliminate the violent bouncing which is frequently a result of such recoil. The auxiliary spring 6, therefore, stabilizes the action of the main spring 2 and does this without detracting in any way from the resilient qualities of said spring in supporting the load.

The device has the further advantage that it can be easily applied to any automobile and the installation of the stabilizing spring involves no change in the present structure of the automobile.

Moreover the installation can be effected without drilling any holes in the frame and this makes it possible to apply the device with simply a wrench.

The straps 10 of the shackles 8 are shown as having projections 15 extending inwardly therefrom and which underlie the spring 2. The purpose of these projections is to maintain the roll 14 in engagement with the top of the spring 2 and prevent any undesirable clatter such as would result if the roll were free to lift from the spring 2.

I claim:

1. In a vehicle, the combination with a vehicle frame and axle, of a main load-supporting spring secured to the axle and having its ends secured to the frame, an auxiliary stabilizing spring secured centrally to the axle, shackles connecting the ends of the stabilizing spring with the main spring, each shackle comprising two straps connected to the stabilizing spring, a roll carried by each pair of straps and resting against the upper side of the main spring, each strap having ears struck up therefrom which engage the under side of the main spring thereby to hold the roll in engagement with said spring.

2. In a vehicle, the combination with a vehicle frame and axle, of a main load-supporting spring secured to the axle and having its ends secured to the frame, an auxiliary stabilizing spring secured centrally to the axle, shackles connecting the ends of the stabilizing spring with the main spring, each shackle comprising two straps connected to the stabilizing spring, a roll carried by each pair of straps and resting against the upper side of the main spring, each strap having means to hold the roll in engagement with main spring.

In testimony whereof, I have signed my name to this specification.

RAYMOND I. FERNSTROM.